(No Model.)

G. R. UNKEFER.
HOSE NOZZLE SUPPORT.

No. 509,187. Patented Nov. 21, 1893.

Witnesses:
Lorin R. Vorce.
Lorin Smith

Inventor:
George R. Unkefer
by Q. R. Vorce
Attorney.

UNITED STATES PATENT OFFICE.

GEORGE R. UNKEFER, OF CLEVELAND, OHIO.

HOSE-NOZZLE SUPPORT.

SPECIFICATION forming part of Letters Patent No. 509,187, dated November 21, 1893.

Application filed July 7, 1893. Serial No. 479,811. (No model.)

*To all whom it may concern:*

Be it known that I, GEORGE R. UNKEFER, a citizen of the United States, residing at Cleveland, in the county of Cuyahoga and State of Ohio, have invented certain new and useful Improvements in Hose-Nozzle Supports; and I do hereby declare the following to be a full, clear, and exact description of the invention, such as will enable others skilled in the art to which it appertains to make and use the same.

My invention relates to means for supporting and holding in any desired position the nozzle of a hose. The object is to simplify the mechanism and reduce its cost while at the same time increasing its adaptability and efficiency; and it consists in the novel construction and arrangement hereinafter described and specifically pointed out in the claims.

In general terms my invention consists in constructing a hose-nozzle support in the form of a light tripod, easily moved and secure against upsetting, one of its feet having an anchoring prong or point, and with a vertical body surmounted by a spring-clasp to hold the nozzle in the desired position.

Figure 1:
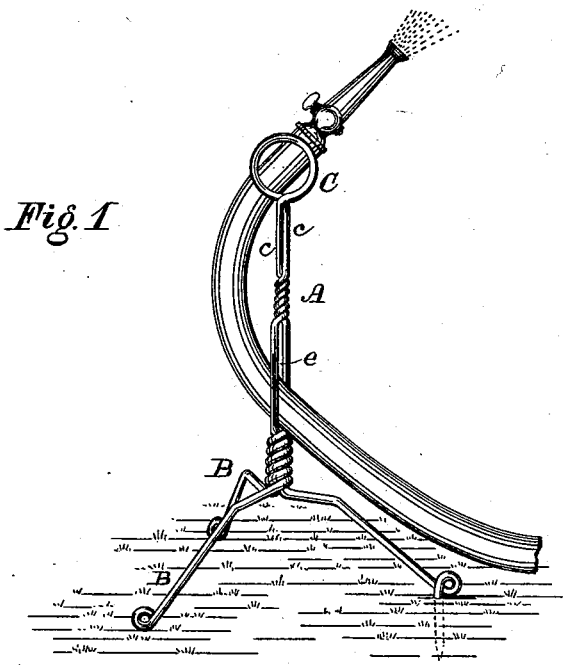
Figure 2:
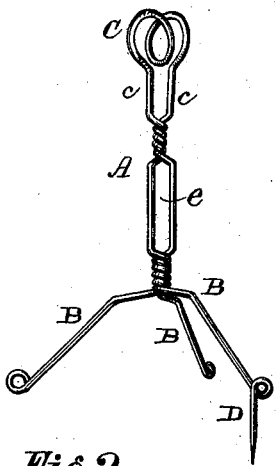
Figure 3:
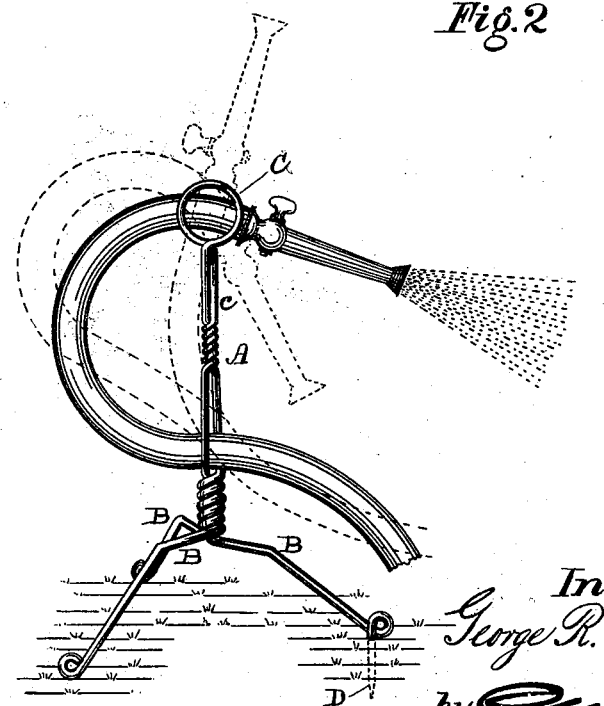

In the drawings Figure 1 is a perspective view of the apparatus with the hose in position, and Fig. 2 is a view of the support alone. Fig. 3 shows the various ways of holding the hose.

A represents the body or standard, B B B the supporting legs, C the spring-clasp for holding the nozzle or hose, D an anchor-pin or point on one of the legs for securing the apparatus in place, e an opening for holding the hose below the nozzle when required.

Although applicable to any hose, my invention has special reference to so-called gardenhose, more commonly used for sprinkling lawns and walks than for any other purpose, and is designed to obtain all the advantages of the well-known lawn sprinklers without interfering with the ready use of the hose for other purposes. By forming the support with a tripod base it is prevented from overturning as is very liable to happen from winds, or the force of the water issuing from the hose, unless means is provided to avert it, and which, if it happens, is liable to cause unsightly holes to be washed out where the nozzle rests upon the ground, besides doing other damage. The anchor point D not only gives further and entire security against overturning, but serves as a pivot around which the support with hose in place can be turned, so that the issuing jet or spray can be directed in any direction.

The spring-clasp is formed to open in a vertical plane and so that the hose or nozzle may be placed therein with the nozzle pointing in any direction from horizontal to vertical either upward or downward, and consists of two rings or disks supported on spring-stems $c$, between which rings or disks the nozzle, or preferably the hose just back of the nozzle, as shown in Fig. 3, is placed. Although not essential it is often desirable to hold the hose at a point below the nozzle as well as at the nozzle, and for that purpose I provide an opening $e$ in the body or standard of the support, through which opening the hose can be drawn to support it, as shown by dotted lines in Fig. 3.

While it is not essential that the whole should be formed in one piece, or that the clasp C should be integral with the standard A, and I do not limit myself to such construction, as the body, legs, clasp and anchor-pin may all be separately made and secured together, yet I prefer for convenience and economy to make the support of heavy wire, all in one piece except the third leg, and in such case the clamp C consists of two or more spiral turns of the wire at about its middle, succeeded on each side by the straight portion $c$, below which the free ends are twisted together to form the body or standard A, with or without the intermediate opening $e$, and at the lower part of the standard are twisted around one end of a separate wire for a short distance, and the three free ends are turned outward and form the tripod legs, at the extremity of one of which the anchor point D is turned down, as shown in the drawings.

When the hose is passed through the standard of the support, the whole is easily grasped and lifted by one hand when it is desired to move the support and hose to another point, and on reaching the new position a slight pressure of the foot forces the anchor point D into the ground and secures the support in place as before. When thus constructed the support is unbreakable and cannot get out of order, and a feature of especial importance is the absence of pivots, screws or screw threads, which in this class of apparatus are exceedingly liable to rust and stick fast.

What I claim as my invention, and desire to secure by Letters Patent, is—

1. A hose-nozzle support comprising a spring clasp for the nozzle supported upon a standard having an intermediate hose-support and a tripod base with an anchor-point on one of its feet, substantially as described.

2. A hose-nozzle support comprising a clamp for the nozzle composed of two appressed rings having spring stems supported on a standard which has an intermediate opening for the hose and a tripod base with an anchor-point on one of its feet, substantially as described.

3. A hose-nozzle support having the twisted wire body with intermediate opening $e$, the spiral spring-clasp for the hose formed integral with the body, and the supporting legs or feet one of which is provided with an anchor-point, substantially as described.

In testimony whereof I hereto affix my signature in presence of two witnesses.

GEORGE R. UNKEFER.

Witnesses:
P. PRENTISS,
L. PRENTISS.